United States Patent [19]

George

[11] Patent Number: 5,020,856
[45] Date of Patent: Jun. 4, 1991

[54] THREE-POINT SEAT BELT

[75] Inventor: Philip C. George, Greensboro, N.C.

[73] Assignee: Volvo GM Heavy Truck Corporation, Greensboro, N.C.

[21] Appl. No.: 932,185

[22] Filed: Nov. 18, 1986

[51] Int. Cl.⁵ .............................................. A62B 35/00
[52] U.S. Cl. ..................................... 297/483; 297/345; 297/468; 297/471; 280/801; 280/808
[58] Field of Search ............... 297/483, 473, 470, 471, 297/345, 346, 468; 248/421; 280/801, 808

[56] References Cited

U.S. PATENT DOCUMENTS

| | | | |
|---|---|---|---|
| 3,298,654 | 1/1967 | Dome | 248/421 |
| 3,447,833 | 6/1969 | Rice . | |
| 3,758,158 | 9/1973 | Radke et al. | 297/468 |
| 3,761,127 | 9/1973 | Giese et al. | 297/346 |
| 3,847,434 | 11/1974 | Weman . | |
| 3,856,351 | 12/1974 | Garvey . | |
| 3,860,261 | 1/1975 | Takada . | |
| 3,877,748 | 4/1975 | Eggert . | |
| 3,890,002 | 6/1975 | Warmskessel | 297/385 |
| 3,929,351 | 12/1975 | Fricko . | |
| 3,957,304 | 5/1976 | Koutsky et al. | 297/468 |
| 3,981,519 | 9/1976 | Cataldo . | |
| 3,994,513 | 11/1976 | Courtis et al. . | |
| 4,025,110 | 5/1977 | Poorman | 297/468 |
| 4,033,622 | 7/1977 | Boudreau | 297/484 |
| 4,060,260 | 11/1977 | Collins . | |
| 4,083,602 | 4/1978 | Mori et al. . | |
| 4,146,268 | 3/1979 | Bost . | |
| 4,173,357 | 11/1979 | Jahn et al. . | |
| 4,186,937 | 2/1980 | Schultz | 297/383 |
| 4,225,185 | 9/1980 | Krzok . | |
| 4,236,755 | 12/1980 | Pollitt et al. . | |
| 4,238,135 | 12/1980 | Sandham | 297/468 |
| 4,289,352 | 9/1981 | Ashworth . | |
| 4,294,467 | 10/1981 | Frantom . | |
| 4,323,278 | 4/1982 | Sukopp et al. . | |
| 4,348,037 | 9/1982 | Law et al. . | |
| 4,384,735 | 5/1983 | Maeda et al. . | |
| 4,431,233 | 2/1984 | Ernst . | |
| 4,451,060 | 5/1984 | Sylven . | |
| 4,466,666 | 8/1984 | Takada . | |
| 4,473,242 | 9/1984 | Weman . | |
| 4,482,188 | 11/1984 | Tilly et al. . | |
| 4,515,395 | 5/1985 | Patterson | 297/483 |
| 4,550,933 | 11/1985 | Patterson . | |

Primary Examiner—Peter R. Brown
Attorney, Agent, or Firm—Watts, Hoffmann, Fisher & Heinke Co.

[57] ABSTRACT

A seat assembly for over-the-highway trucks and tractors including a seat (10) having a frame (16), a cushion (17) and a back (25). The assembly includes a three-point seat belt structure including a retractor (52), a shoulder anchor (58) on a support (67), a lock (56) and an anchor (54). Vehicle cab and frame structure connected tethers (30, 31, 71) limit seat and seat belt movement in the event of an accident.

25 Claims, 2 Drawing Sheets

THREE-POINT SEAT BELT

DESCRIPTION

1. Technical Field

This invention relates to three-point seat belt constructions and more particularly a novel and improved lap and shoulder strap retaining belt assembly for over-the-highway trucks and tractors.

2. Background Art

The typical operator seat in a North American over-the-highway truck or tractor has a support which permits a six inch range of vertical movement. Usually an articulated linkage is interposed between a seat frame and a base pedestal to allow the seat to move upwardly and downwardly.

An operator will adjust the seat to a desired height such as by pneumatically inflating a bag which functions as an air spring. Assuming the seat is adjusted to a mid-point in the range of vertical movement, the seat may move upwardly or downwardly three inches from the center providing the six inch range of vertical movement. Because of this wide range of movement, there has not been any fully satisfactory system for providing a so-called three-point seat belt arrangement for such seats.

European vehicles have been equipped with three-point seat belt arrangements in which a pair of cab mounted inertial retractors are provided. One inertial retractor is connected to an end of a lap belt section of a three-point hitch, while the other is connected to an end of a shoulder strap section. While such arrangements have proven satisfactory and acceptable for European operation, it is at least in part because the typical vertical range of adjustment of a European truck seat is of the order of three inches as contrasted with American six inch adjustment range.

With the retractors cab mounted in accordance with a typical European system, the retractors will tend to lock up more often if applied to an American seat. This is not only due to differences in the range of seat movement, but also due to differences in the required sensitivities. Under U.S. law a retractor should lock in response to a 0.7 g force, while in Europe it need do so only in response to a force of 0.85 g or greater. If the shoulder strap locks up due to, for example, bouncing of the operator as he is driving over a rough road, as a minimum the operator will find the seat belt arrangement very uncomfortable. In addition, the amount of vertical travel which such a seat experiences will have a negative effect on retractor durablility. There is also a question as to how effective the shoulder restraint would be throughout such a wide range of operator movement relative to a fixed shoulder strap support.

There have been proposals for securing lap and shoulder straps to vehicle seats. While there have been such proposals, it is questionable whether such prior proposals will meet current government standards, especially if adapted to heavy duty over-the-highway trucks and tractors. Under these standards a lap belt must withstand a 5,000 pound pull test. With a three-point system the lap portion must withstand that same 5,000 pound pull test and at a different time a 3,000 pound pull test on the shoulder strap.

DISCLOSURE OF THE INVENTION

A three-point belt system made in accordance with the present invention is fully seat mounted for maximum driver comfort but at the same time is constructed to satisfy the requirements of current government standards, that is to withstand the 5,000 and 3,000 pound pull tests on the lap and shoulder portions respectively.

In a system constructed in accordance with the present invention, a commercially available seat assembly is employed such as that sold by the Bostrom Corporation of Milwaukee, Wisconsin, under the designation BOSTROM AIR 715E. Other suitable seats are disclosed and described in Bostrom Corporation owned U.S. Pat. No. 3,325 136 entitled Seat Suspension, U.S. Pat. No. 3,356,413 entitled Vehicle Seat and U.S. Pat. No. 3,335,996 entitled Variable Damping Control for Seats. If used in accordance with the present invention, the seats of those patents will be modified by providing a tether bar as a part of the seat frame. Such a tether bar extends laterally across the seat frame and is secured to and becomes a part of the frame above the articulated suspension and below a passenger cushion.

A seat belt retractor and a seat belt anchor are secured to the tether bar near one end. A belt lock is secured to the tether bar near its opposite end and on a side of the passenger cushion opposite the retractor and anchor.

A generally L-shaped shoulder support is secured to the frame and includes an upstanding arm. A D-ring is secured to the arm near its top by a belt restrainer such that the upstanding arm, the seat belt restrainer and the D-ring together provide a shoulder span anchor.

A seat belt extends from the retractor through the D-ring, then through a seat belt latch to an end secured to the seat belt anchor. The entire three-point hitch assembly is secured to and forms a part of the seat moving vertically with the seat frame.

Tethers are provided which are flexible and of sufficient length to allow the seat to move through its range of movement The tethers anchor the three-point system under stress conditions in order that a vehicle passenger will be restrained and the seat belt arrangement can pass the described tests.

In its preferred form the upstanding arm is formed of a material whose elastic limit will not be exceeded during motion occasioned by a shoulder strap test. This assures that a stressed upstanding arm, under at least most stress conditions, will return to its original position after the stress has been relieved. Thus, after stress it is again in a preferred position rearwardly of a seat back where it will not interfere with normal passenger movement.

Accordingly the object of the invention is to provide a novel and improved three-point seat belt assembly and a novel and improved seat and seat belt combination for use in over-the-highway trucks and tractors.

BEST MODE FOR CARRYING OUT THE INVENTION

Figure 1:
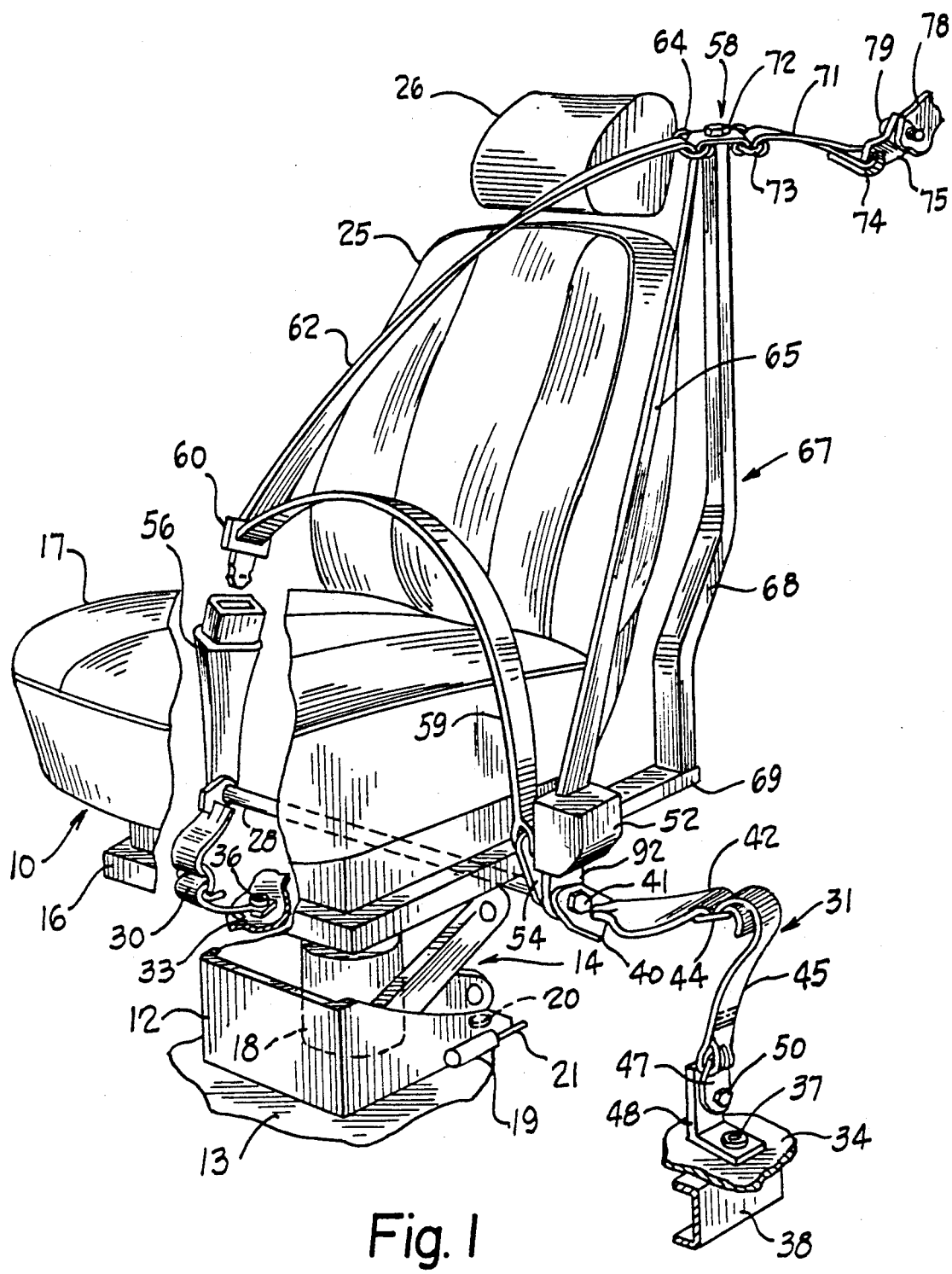
FIG. 1 is a perspective view of a test seat belt and seat assembly made in accordance with this invention with parts broken away and removed and with fragmentary portions of a vehicle being shown to illustrate the physical interconnection of the seat and belt assembly with the vehicle.

Referring now to the drawings and to FIG. 1 in particular, a seat is shown generally at 10. The seat includes a pedestal 12 mounted on and secured to floor and frame structure of a vehicle cab, a fragmentary section of which is shown at 13.

An articulated seat supporting linkage 14 is carried by the pedestal The articulated linkage 14 supports a seat frame 16 above it. A seat cushion 17 is carried by the frame 16.

A pneumatic spring is indicated by phantom lines at 18. The pneumatic spring 18 is inflated to elevate the seat cushion 17 to a passenger's selected and adjusted position. This selection and adjustment is accomplished through an air valve 19. An operator simply depresses a control button 20 of the valve 19 so that compressed air from a supply 21 may be fed to the pneumatic spring 18. Alternately the valve can be used to vent air from the bag 18 if an operator wishes to lower the seat cushion.

Once the seat cushion is in its adjusted position with an appropriate volume and pressure of air established in the pneumatic spring 18, the spring functions to reduce the effects on a passenger of vehicle bounce and vibration. The total vertical range of adjustment or movement due to vibration or bouncing of a typical North American truck seat is of the order of 6 inches, and the articulated linkage 14 is capable of providing this range of vertical movement In addition to the cushion 17, a back structure 25 is supported by the frame 16. A vertically adjustable head rest 26 is carried by the back structure 25.

A tether bar 28 extends transversely across the seat frame and forms and is part of the frame 16. Right and left tethers 30, 31 extend from the tether bar to the floor and frame structure, fragmentary portions of which are shown at 33, 34. The tether bar 28 and tethers 30, 31 correspond to structure which has previously been used with lap belt arrangements.

The tethers 30, 31 are respectively anchored to the floor and frame structure by fasteners 36, 37. The fastener 37 is illustrated at a location where it is fixed not just to the floor section 34, but also to a frame channel, a fragmentary portion of which is shown at 38.

The tethers 30, 31 are anchored in identical fashion. The anchoring of the tether 31 is more completely shown and accordingly it will be described, it being recognized that the anchoring of the tether 30 is the same.

A tether eye 40 is secured to an end of the tether bar 28 on a side of the seat cushion which is the passenger's left. A flexible belt section 42 of the tether 31 is secured to the tether eye 40 and a tether belt length-adjuster 44. A lower belt section 45 of the tether 31 spans from the tether belt length adjuster 44 to a lower tether eye 47. The lower tether eye 47 is fixed to a tether bracket 48 by a suitable fastener 50. The bracket 48 is the end of the tether 31 which is anchored to the floor portion 34 by the fastener 37.

A seat belt retractor 52 is connected to the tether bar at a location near the upper tether eye 40. The seat belt retractor 52 is a commercially purchased retractor of the inertial type such as that sold by American Safety Equipment Corporation of Troy, Michigan under the designation Model No. 502307. Two suitable seat belt retractors are shown and described in U S. Pat. Nos. 4,475,697 of Oct. 9, 1984 entitled Inertia Reel Using Modular Locking Mechanism and U.S. Pat. No. 4,562,977 of Jan. 7, 1986 entitled Easily Assembled Seat Belt Retractor and Method.

A seat belt anchor 54 is connected to the tether bar 28 adjacent to the seat belt retractor. A seat belt lock 56 is secured to the tether bar at the end opposite from the retractor and anchor. Expressed another way, the seat belt lock is connected to the tether bar on the side of the cushion opposite the retractor and near the tether bar end anchored by the tether 30. A shoulder span restrainer or anchor is shown generally at 58. The shoulder span anchor provides the third point of the so-called three-point seat belt construction.

A seat belt is provided which includes a lap span 59 having an end secured to the seat belt anchor 54. A seat belt latch 60 is able to slide on the seat belt and delineates the end of the lap span 59 remote from the anchor and the lower end of a chest or shoulder span 62. The latch 60 is selectively connectable in a known manner to the seat belt lock 56 for securing the seat belt over a passenger.

The shoulder span anchor 58 includes a D-ring 64 that delineates the upper ends of the chest span 62 and of a tension span 65. The tension span extends downwardly from the D-ring into the retractor 52. The retractor contains a coil of seat belt material and an end anchor, neither of which are shown, but both of which are constructed in known manners such as shown and described in the referenced seat belt retractor patents.

The shoulder span anchor 58 includes an L-shaped shoulder support 67. The shoulder support 67 includes an upstanding arm 68 and a horizontal leg 69. The horizontal leg is fixed to and becomes an extension of the frame 16. A shoulder tether 71 is connected to an upper end of the support arm 68 by a fastener 72 and a tether eye 73.

An anchor end 74 of the tether 71 is connected to a shoulder tether anchor bracket 75. The bracket 75 in turn is connected to a cab, a fragmentary portion of which is shown at 78, by a suitable fastener 79.

In its preferred form, the arm 68 is made of a material which will not exceed its elastic limit when bent and stressed to the maximum amount that tether 71 will allow. Thus, if a passenger is stressed against the seat belt by an impact that tensions the shoulder tether 71, the arm 68 will return to its prestressed condition once the stress is relieved In its unstressed condition the arm is upstanding from the leg 69 behind an occupant position and to the side of the seat back 25. Thus, the arm is positioned such that it will not interfere with normal seat occupant movement.

The embodiment shown in FIG. 1 and thus far described is a prototype embodiment constructed for testing. The preferred construction for commercial use will differ somewhat in certain respects as shown in FIGS. 2-5.

Figure 2:
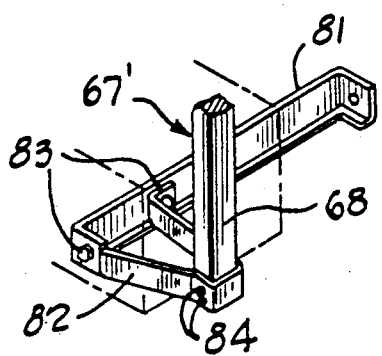
FIGS. 2 and 3 show connections of upstanding arm supports to two commercially available seats; and, FIGS. 4 through 6 show production configurations of a shoulder span anchor, a retractor tether connection, and a tether to floor connection respectively.

Referring to FIG. 2, the reference numeral 81 identifies a flanged channel element of the frame of a seat sold commercially by Dura-Form under the trademark FLEETCRUISER. A U-shaped bracket 82 is secured to the flanged channel element 81 to provide a horizontal leg corresponding to the leg 69 of the L-shaped shoulder support 67 of FIG. 1. The bracket is secured to the flanged channel by fasteners 83 while the upstanding arm 68 is secured to the bracket 82 by fasteners 84.

Figure 3:
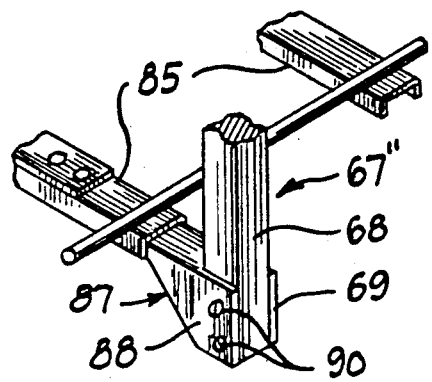

In FIG. 3, reference numeral 85 designates fragmentary frame sections of a seat sold commercially by National Seating Co. under the trademark CUSH-N-

AIRE. Here a bracket 87 is fixed to the frame sections and, similar to the U-bracket 82, is the horizontal leg of L-shaped shoulder support 67. The bracket 87 includes a pair of side plates 88, 89. The upstanding arm 68 is positioned between the side plates 88, 89 and secured to them by fasteners 90.

Figure 4:
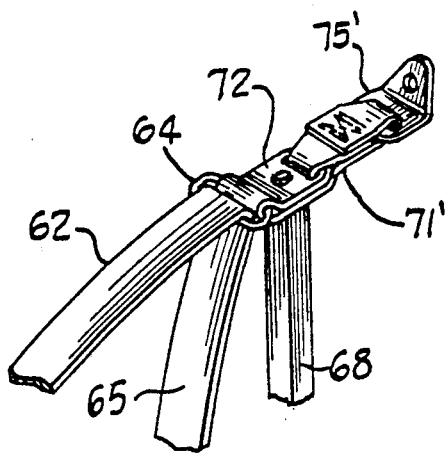
Figure 5:
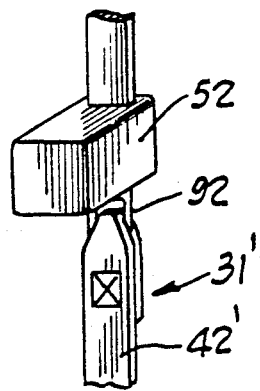
Figure 6:
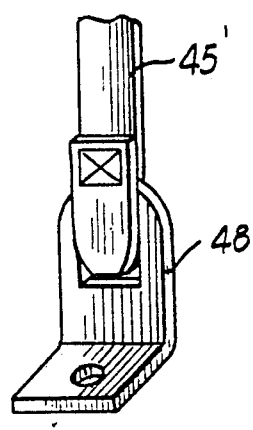

FIGS. 4-6 show simplified commercial versions of tether connections. Specifically in FIG. 4 a shoulder tether 71 is secured to the vehicle by a tether bracket 75 eliminating the tether eye 73. In FIG. 5 a simplified connection of the tether to retractor is shown in which the belt section 42 is directly connected to a retractor extension 92 eliminating the tether eye 40. Similarly, FIG. 6 shows a lower belt section 45' directly connected to the tether bracket 48 eliminating the lower tether eye 47.

Although one embodiment of the present invention has been illustrated and described, the present invention is not to be considered limited to the precise embodiment disclosed. Various adaptations, modifications and uses of the invention may occur to those skilled in the art to which the invention relates and the intention is to cover all such adaptations, modifications and uses which fall within the spirit or scope of the appended claims.

What is claimed is:

1. For use with a vehicle seat, a three point seat belt assembly comprising:
   a) a retractor for connection to a seat frame;
   b) a seat belt anchor for connection to such frame;
   (c) a seat belt including a coiled portion within the retractor and a free end coupled anchor;
   d) a seat belt latch slidably carried by the belt;
   e) a shoulder span anchor and support for attachment to such frame and including a portion slidably connected to the belt and adapted to be positioned near a user's shoulder;
   f) a belt lock for connection to such seat frame and adapted retainingly to engage the latch; and,
   g) tethers for connecting the retractor, the belt anchor, the latch and the span anchor to a vehicle cab and frame structure whereby a vehicle occupant can be restrained without regard to the vertical positioning of such heat.

2. The assembly of claim 1 wherein the retractor, anchor and lock are each adapted to be connected to a portion of a seat frame that is movable in response to height adjustments.

3. The assembly of claim 1 wherein the tethers are flexible to permit vertical seat frame adjustment.

4. The assembly of claim 1 wherein the shoulder span anchor and support includes a post for securement to a lower portion of a seat frame and projection upwardly to provide shoulder support with minimal obstruction to passenger seat occupancy.

5. In combination:
   a) a vertically adjustable vehicle seat including a back and a passenger support mounted on a frame, the seat also including a biased articulated support connected to the frame;
   b) a three point seat and shoulder harness comprising:
   i) a seat belt retractor connected to the frame;
   ii) a seat belt anchor secured to the frame near the retractor;
   iii) a belt lock secured to the frame in spaced relationship with the anchor;
   iv) the anchor and lock being secured to the frame on opposite sides of the passenger support;
   v) a chest span anchor connected to the frame and disposed behind and near the top of the seat back;
   vi) a seat belt secured to the belt anchor and the retractor and including:
      aa) a lap span;
      bb) a chest span; and,
      cc) a tension span.
   vii) a seat belt latch slidably carried by the belt and delineating adjacent ends of the lap and chest spans, the latch and lock being selectively interconnectable to provide vehicle occupant restraint; and,
   viii) the chest span anchor being in slidable engagement with the belt and delineating adjacent ends of the chest and tension spans; and,
   c) tethers secured to the chair frame and the anchors and connected when in use to body and frame structure of a vehicle.

6. The combination of claim 5 wherein the span anchor is carried by an upstanding arm.

7. The combination of claim 6 wherein the arm is non-metallic.

8. The combination of claim 6 wherein the arm extends upwardly from a leg which is generally horizontal when the combination is in use and the leg is connected to the frame.

9. The combination of claim 5 wherein the frame includes a transverse tether bar and the retractor is secured to the tether bar.

10. In an over-the-highway truck or tractor a seat assembly comprising:
   a) a supporting pedestal mounted on floor and frame structure of a vehicle cab;
   b) an articulated linkage connected to and projecting upwardly from the pedestal;
   c) a seat frame connected to and supported on the linkage;
   d) cushion and back structure carried by the frame and constructed to receive a seated passenger;
   e) spring means interposed between the pedestal and cushion and constructed selectively to effect seat height adjustment and to provide yieldable support for the structure and a passenger seated thereon;
   f) a seat belt retractor and a seat belt anchor connected to the frame to one side of the cushion structure;
   g) a belt lock connected to the frame to the other side of the cushion structure;
   h) a shoulder support connected to the frame and extending upwardly relative to the cushion and back structure rearwardly of said structure and an occupant's shoulder;
   i) a seat belt restrainer connected to the shoulder support such that the restrainer and the shoulder support together provide a shoulder span anchor;
   j) a seat belt extending from the retractor through the restrainer to a remote end secured to the belt anchor;
   k) a belt latch slidably carried by the belt between the restrainer and the anchor, the latch being detachably connectable to the belt lock;
   l) a pair of flexible base tethers fixed to the floor and frame structure on either side of the pedestal and respectively connected to the frame; and,
   m) a shoulder tether connected to the shoulder support and the vehicle cab.

11. The assembly of claim 10 wherein the shoulder support is connected to the frame at a location lower than the cushion.

12. The assembly of claim 10 wherein the shoulder support is generally L-shaped with the leg of the L connected to the frame and disposed generally horizontally and, the leg extends rearwardly from the frame.

13. The assembly of claim 10 wherein the shoulder support includes an upstanding arm of a material having sufficient flexibility to return to its original configuration even after being stressed to the limit permitted by the shoulder tether.

14. The assembly of claim 13 wherein the arm is non-metallic.

15. The assembly of claim 10 wherein the spring means includes a pneumatically inflatable bag.

16. For use in an over-the-highway truck or tractor a seat assembly comprising:
   a) a supporting pedestal adapted to be mounted on floor and frame structure of a vehicle cab;
   b) an articulated linkage connected to and projecting upwardly from the pedestal;
   c) a seat frame connected to and supported on the linkage;
   d) cushion and back structure carried by the seat frame and constructed to receive a seated passenger;
   e) spring means interposed between the pedestal and cushion and constructed selectively to effect seat height adjustment and to provide yieldable support for the structure and a passenger seated thereon;
   f) a seat belt retractor and a seat belt anchor connected to the seat frame to one side of the cushion structure;
   g) a belt lock connected to the seat frame to the other side of the cushion structure;
   h) a shoulder support connected to the seat frame and extending upwardly relative to the cushion and back structure and rearwardly of an occupant position;
   i) a seat belt restrainer connected to the shoulder support such that the restrainer and the shoulder support together provide a shoulder span anchor;
   j) a seat belt extending from the retractor through the restrainer to a remote end secured to the belt anchor;
   k) a belt latch slidably carried by the belt between the restrainer and the anchor, the latch being detachably connectable to the belt lock;
   l) a pair of flexible base tethers adapted to be fixed to such floor and frame structure on either side of the pedestal and respectively connected to the seat frame; and,
   m) a shoulder tether adapted to be connected to the shoulder support and such vehicle cab.

17. The assembly of claim 16 wherein the shoulder support is connected to the frame at a location lower than the cushion.

18. The assembly of claim 16 wherein the shoulder support is generally L-shaped with the leg of the L connected to the frame and adapted to be disposed generally horizontally when in use and, the leg extends rearwardly from the frame.

19. The assembly of claim 16 wherein the shoulder support includes an upstanding arm of a material having sufficient flexibility to return to its original configuration even after being stressed to the limit permitted by the shoulder tether.

20. The assembly of claim 19 wherein the arm is non-metallic.

21. The assembly of claim 16 wherein the spring means includes a pneumatically inflatable bag.

22. In combination with an over-the-highway truck or tractor vehicle seat including a frame, a vertically adjustable vibration absorbing frame support connected to the frame, and an occupant support adjustably carried by the frame, a three point seat belt assembly comprising:
   a) a retractor connected to the seat frame;
   b) a seat belt anchor also connected to the frame;
   c) a seat belt including a coiled portion within the retractor and a free end coupled to the belt anchor;
   d) a seat belt latch slidably carried by the belt;
   e) a shoulder span anchor and support attached to said frame and including a portion slidably connected to the belt at a location behind and near the top of said occupant support;
   f) a belt lock connected to the seat frame and including means retainingly to engage the latch; and,
   g) tethers connected to the assembly and when in use to a vehicle cab and frame structure whereby a vehicle occupant can be restrained without regard to the vertical positioning of such frame.

23. The assembly of claim 22 wherein the retractor, anchor and lock are each connected to a portion of the seat frame that is movable in response to height adjustments.

24. The assembly of claim 23 wherein the tethers are flexible to permit vertical seat frame adjustment.

25. The assembly of claim 22 wherein the shoulder span anchor and support includes a post secured to a lower portion of the seat frame and projecting upwardly to provide shoulder support with minimal obstruction to passenger seat occupancy.

* * * * *

UNITED STATES PATENT AND TRADEMARK OFFICE
CERTIFICATE OF CORRECTION

PATENT NO. : 5,020,856
DATED : June 4, 1991
INVENTOR(S) : Philip C. George

It is certified that error appears in the above-identified patent and that said Letters Patent are hereby corrected as shown below:

Column 5, line 32, after "coupled" insert -- to the --;

Column 5, line 44, change "heat" to -- seat --.

Signed and Sealed this

Second Day of February, 1993

Attest:

STEPHEN G. KUNIN

*Attesting Officer*    Acting Commissioner of Patents and Trademarks